UNITED STATES PATENT OFFICE.

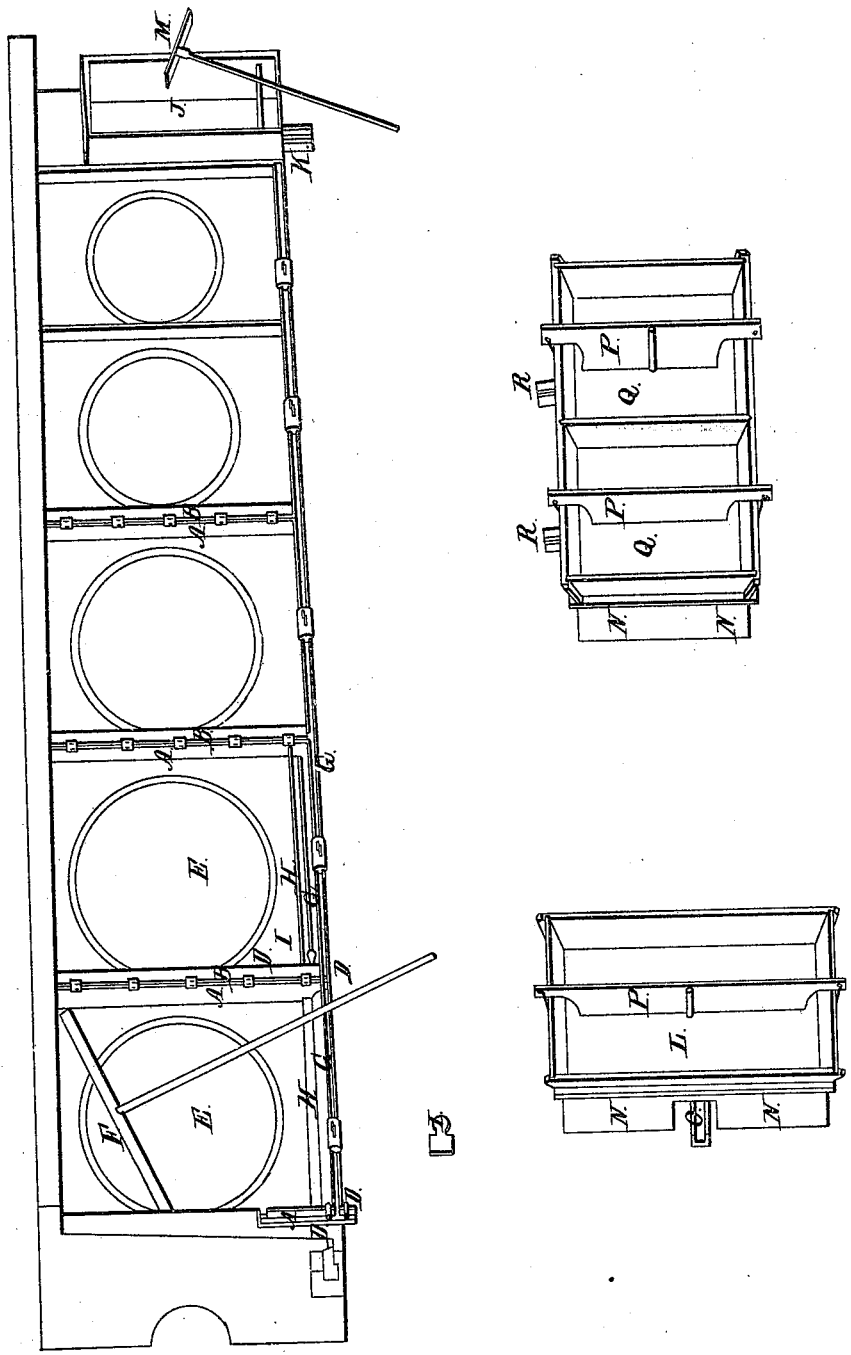

DON JUAN RAMOS, OF PORTO RICO, WEST INDIES, ASSIGNOR TO JAMES C. GALLAHER, OF PHILADELPHIA, PENNSYLVANIA, AND WM. F. TIRADO, OF PORTO RICO, WEST INDIES.

IMPROVEMENT IN SUGAR-BOILING APPARATUS.

Specification forming part of Letters Patent No. 9,086, dated June 29, 1852.

*To all whom it may concern:*

Be it known that I, DON JUAN RAMOS, a native of the Island of Porto Rico, and subject of Her Majesty the Queen of Spain, assignor to JAMES C. GALLAHER, a native of the city of Philadelphia, State of Pennsylvania, and consul of the United States of America at the Port of Ponce, Island of Porto Rico, and WILLIAM F. TIRADO, a native of the town and merchant of the Port of Ponce, in the Island of Porto Rico, have invented and discovered certain new and useful improvements in the apparatus for manufacturing muscovado, or raw sugar, from the sugar-cane, by which the quality is improved and the quantity obtained from any given amount of canes augmented; and I do hereby declare the following to be a full, clear, and exact description thereof, reference being had to the accompanying drawings and letters marked thereon, forming a part of this specification, namely—

To any number of sugar-pans as ordinarily mounted for boiling the juice of the sugar-cane I attach transverse canals A A, with lids B B, connecting with a longitudinal canal, C, which extends the entire length of the battery. The object of these transverse canals is, when their lids are raised, to receive the froth of the boiling liquor, and in connection with the said longitudinal canal, and with the use of the movable gates D D, to return it directly and tranquilly to either of the receiving-pans E E, in place of brushing it back from pan to pan, as is the ordinary mode. The skimmings or feculencies from the receiving-pans are taken off by a rake or scraper, F, applied by me for the first time to this purpose, and are thrown by it into and are carried off by a separate canal, G G, which is placed lower down and in a line with the longitudinal canal above mentioned. The use of the rake or scraper in combination with the rest of my process obviates the necessity of a skimmer at the receiving-pans and saves the labor of one hand at the battery. This lower canal is supplied with a lid, H H, against each receiving-pan, which is thrown down toward the canal when it is desired to scrape off the skimmings or feculencies. Each lid is supported in an upright position by the movable blocks I I. Each and every lid B B H H in the battery is provided with linen or other cloth at the joints to prevent the passage of the liquor through them. When the sirup is ready to strike I throw it into a wooden box, J, mounted at the end of the battery. This box has a hole in the bottom which is stopped with a plug. After the strike is thrown into it the plug is taken out and the sirup allowed to pass off by a canal, K, into the cooler L. In order to prevent the passage of the froth which sometimes forms on the surface into the cooler, a small rake or scraper, M, is used to hold it back. Under each cooler I build a close wall, N N, in order to retain some heat under the cooler, leaving only a space open on one side, through which to introduce under the cooler a small canal, O, by which the molasses is drawn off. Each cooler has a hole in the bottom stopped by a plug. In the middle of each cooler is placed lengthwise a movable plank, P P, set edgewise and fastened at each end with hooks, the lower part of each end of the plank being cut so as to allow the liquor or sirup to circulate around it. When the plank is lifted out the molasses passes into the vacancy, and thence through the hole in the bottom of the cooler, and by the small canal beneath into a vessel placed to receive it. For the after operation with this molasses—that is, to obtain a further yield of sugar from it by crystallization—I use a double cooler, Q, or, in other words, a cooler of the above description divided into two compartments, each compartment being provided with its movable plank, hole, and plug, and separate canal R R below.

The letters A B C D, &c., in the above specification refer to the several parts and sections of the accompanying drawings.

What I claim as my own invention and discovery, and desire to secure by Letters Patent, is—

1. The construction of the transverse canal A, in combination with the hinged cover B, for the double purpose of returning the froth to the receiving-pans, and for preventing the sirup from falling into the canal while being ladled from one pan to the other.

2. The construction of the lower longitudinal canal, G, with its hinged board H, for the purpose of more effectually removing the feculencies, as described.

3. The use of the movable plank P in the coolers, which, when removed, leaves a vacancy or channel for the molasses to flow away to the discharge-aperture through the bottom of the cooler.

In testimony whereof I have hereunto signed my name before two subscribing witnesses, at Ponce, Porto Rico, the 6th day of May, in the year 1852.

JUAN RAMOS.

Witnesses:
G. LOHN,
RAM COSTADA.